UNITED STATES PATENT OFFICE.

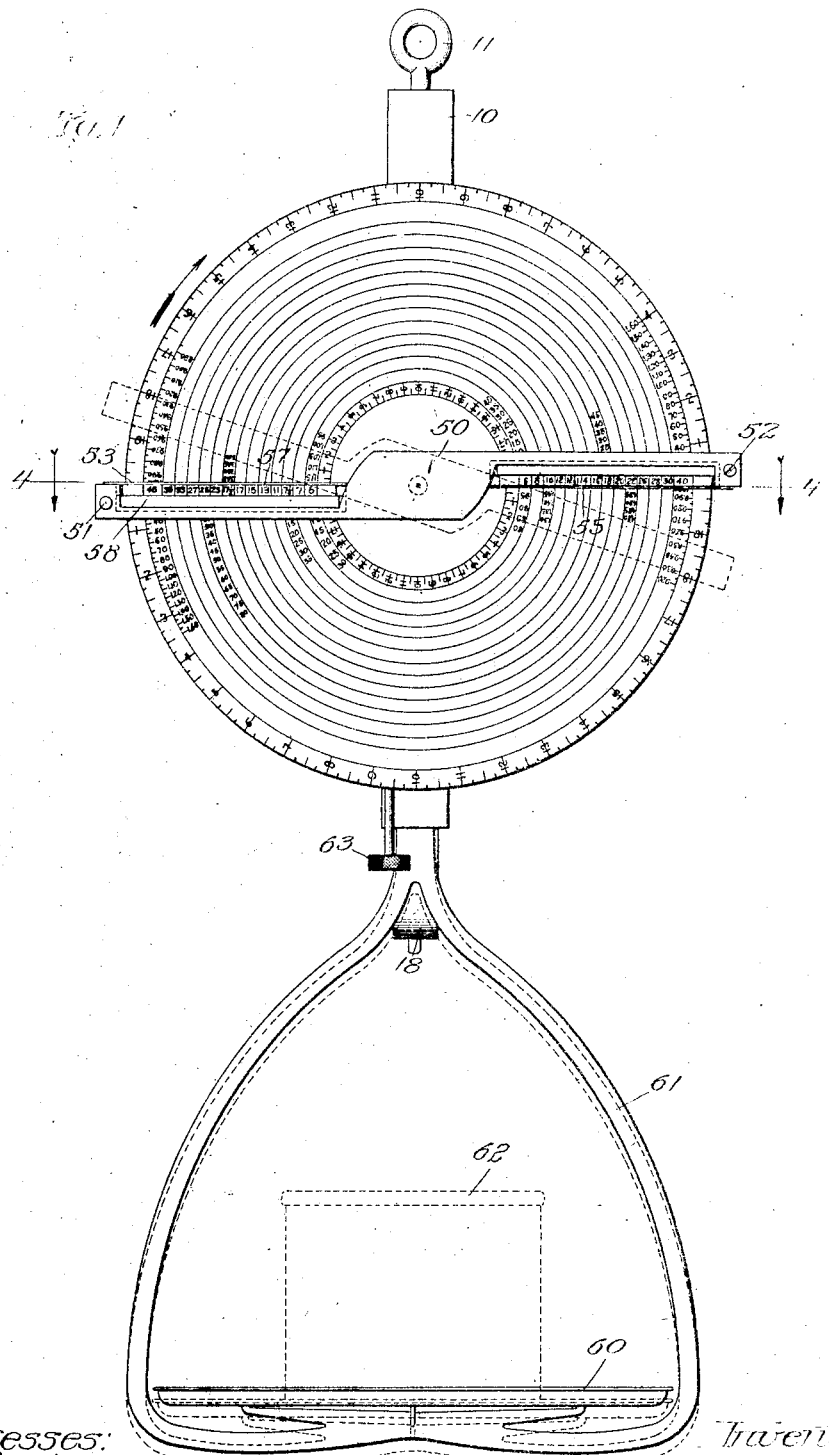

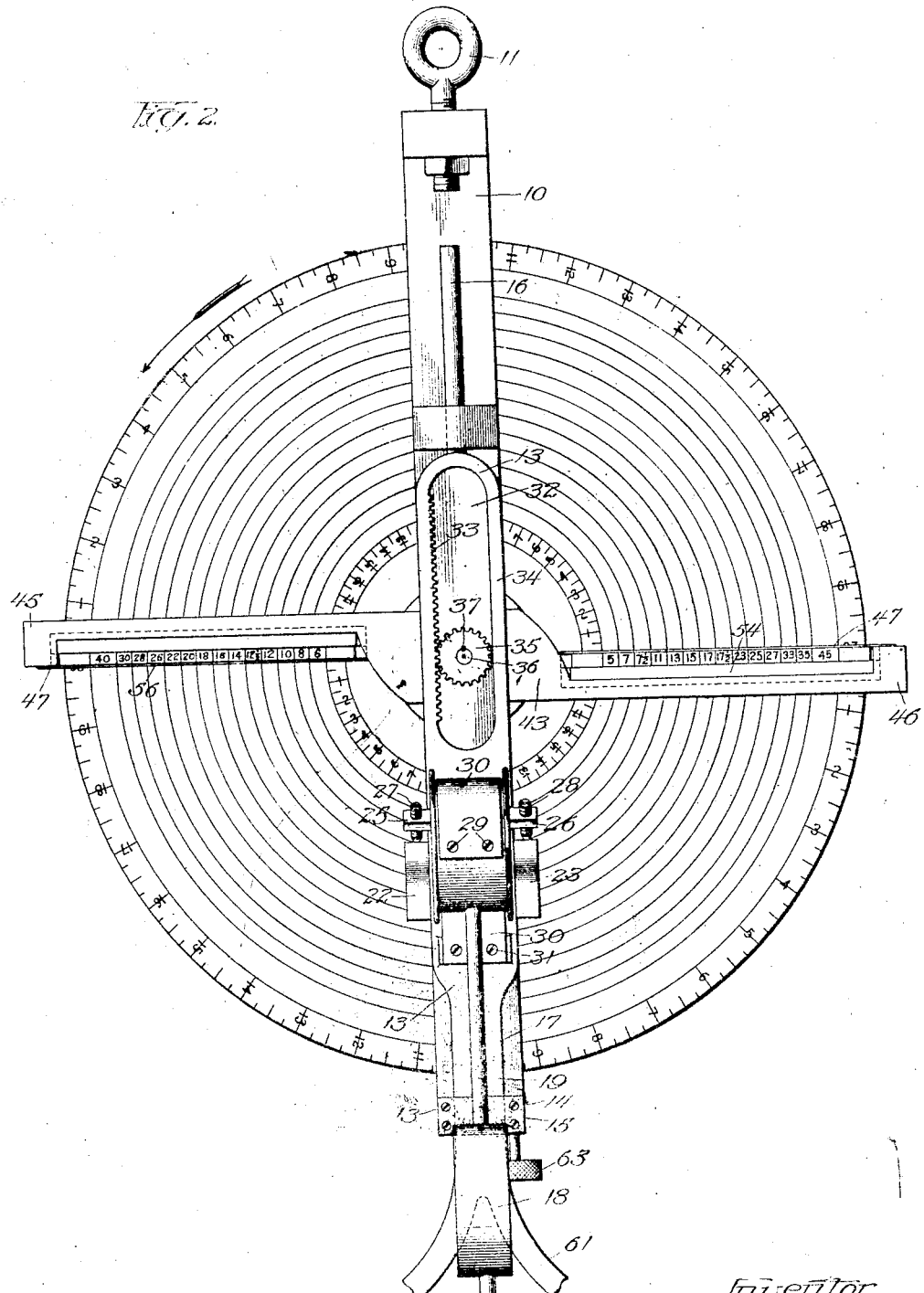

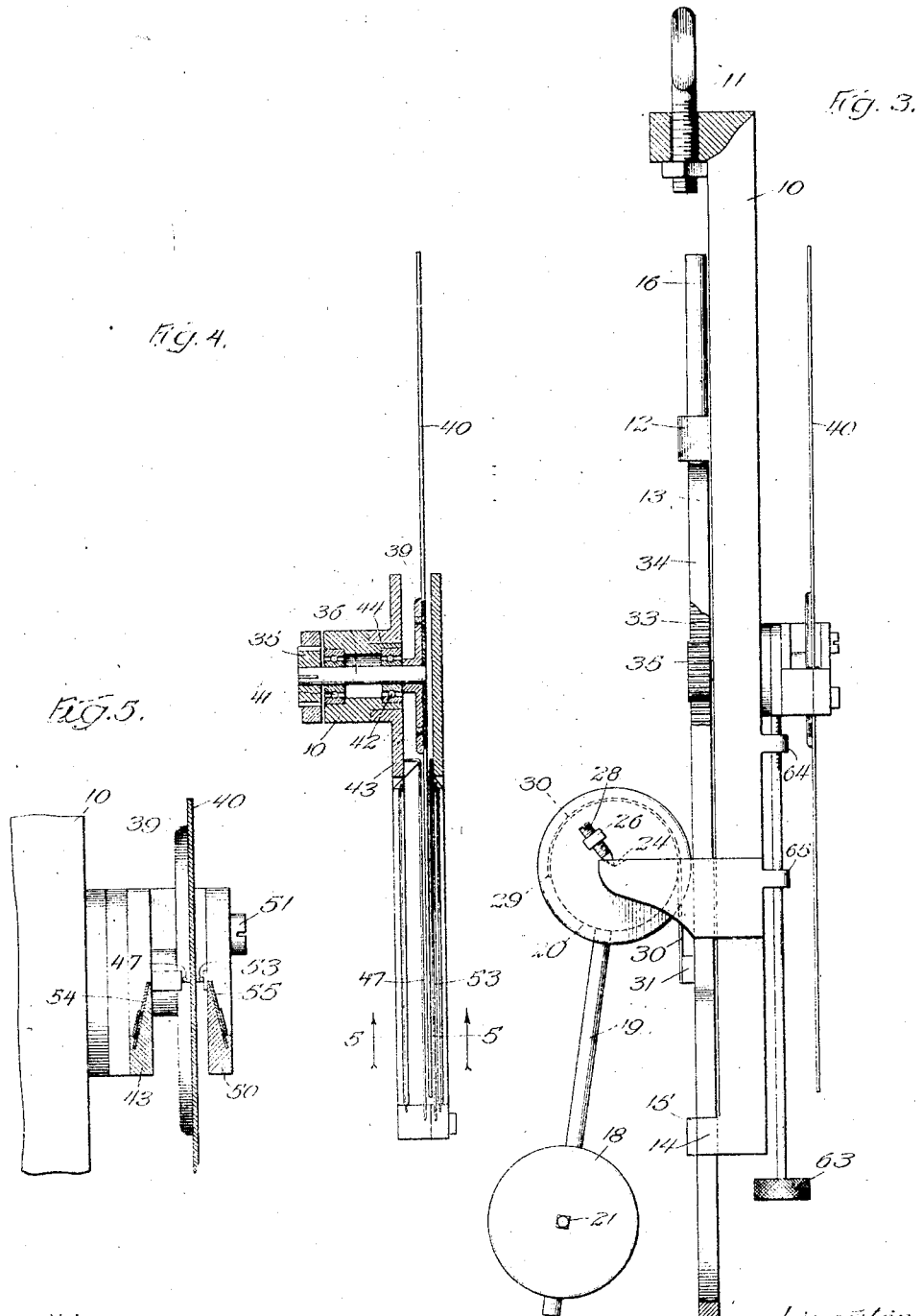

GEORGE W. KONE, OF ROCK ISLAND, ILLINOIS.

COMPUTING-SCALE.

1,112,808.  Specification of Letters Patent.  Patented Oct. 6, 1914.

Application filed September 23, 1912. Serial No. 721,745.

*To all whom it may concern:*

Be it known that I, GEORGE W. KONE, a citizen of the United States, residing at Rock Island, in the county of Rock Island and State of Illinois, have invented certain new and useful Improvements in Computing-Scales, of which the following is a specification.

My invention relates to improvements in computing scales.

One of the objects of my invention is to provide a scale, of the character described, which is simple in its parts, cheap of construction, accurate and efficient in operation and which has a wide range of usefulness.

Other and further objects of my invention will become readily apparent to persons skilled in the art from a consideration of the following description when taken in conjunction with the accompanying drawings, which form a part hereof, wherein—

Figure 1 is an elevation of the scale complete showing the front face; Fig. 2 is a similar view of the scale with the scale-pan left off, and somewhat enlarged, showing the rear face; Fig. 3 is a side elevation, showing parts in section; Fig. 4 is a transverse section on line 4—4 of Fig. 1; and Fig. 5 is an enlarged section on line 5—5 of Fig. 4.

In all the views the same reference characters indicate similar parts.

10 is a frame rotatably supported by a supporting eye-bolt 11 so that the frame may be rotated on the eye-bolt in order that the dial may be turned in any direction for the purpose of more convenient observation. A lug 12 projects laterally from the frame and affords bearing for a sliding rack member 13. Two similar projections 14 and 15 project from the lower end of the frame to afford guiding and bearing support therebetween for the lower end of the sliding member. The projections 13 and 14 are connected together by a strap 15 which prevents the sliding member from being disengaged from the frame. The upper end of the sliding member 13 is round, as at 16, for lateral movement in the bearing 12 while the lower end 17 is flat for lateral movement in the bearings 14 and 15. It will therefore be seen that the sliding member 13 has considerable vertical movement in the bearings supplied by the frame 12.

A weight 18 is adjustably secured on the rod 19, that has its inner end fastened to a drum 20. The weight may be moved in and out, on the rod 19, and secured in adjusted position by the set screw 21. Projecting rearwardly from the frame 10, are brackets 22 and 23, which are preferably integral parts of the frame. These brackets are provided with tapering depressions 24—24 near the ends into which the bearings for the weight member project. Projecting from each side of the drum 20 are lugs 25 and 26 through which hardened tapered points afforded by the adjustable bearing screws 27 and 28 are screw threaded to provide bearing supports in the said tapering depressions, for the weight member. As will be observed the points of the screws are much more acute than the taper of said depressions so that the weight may be oscillated through a considerable arc of a circle during which movement the adjustable bearing screws 27 and 28 will make contact with the tapered depressions 24—24 only at their respective points. These screws are in line substantially with the concentric axis of the drum 20. By this means the weight 18 may be moved out of a substantially vertical position to a position almost at right angles to that which it occupies in Fig. 3, with very light if any frictional resistance being interposed by its bearings. Connected to the drum 20, as at 29, a flexible ribbon, chain, or the like, 30, is secured and passed around the top portion of the drum, the other end being connected to the sliding member 13 as at 31. While I have shown a band, which may be of any material for the purpose, such as bronze, steel, or the like, it is quite evident that a chain may be substituted, or any other flexible medium that is well designed to oscillate the weight when the sliding member is moved in its vertical plane.

The sliding member is slotted as at 32. The continuing portion on one side of the slot may be formed into a rack 33 the other side 34 being provided with a smooth inwardly projecting face. A pinion 35 meshes in the rack 33 and is secured to a shaft 36 by means of a key 37.

Now it is evident that when the sliding member 13 is moved vertically in its bearings, on the frame 10, that the pinion 35 will be rotated by means of the rack 33 and likewise the shaft 36 will be rotated with the pinion. If the sliding member 13 be depressed the weight 18 will be raised, and when the pressure on the sliding member 13 is relieved the weight 18 will again raise the sliding member to its normal position. When the sliding member is vibrated, in the manner described, the rack 33 rotates the pinion 35 and thereby the shaft 36.

Secured to the shaft 36 is a hollow flanged boss 39 to which is attached a computing dial 40, so that when the shaft 36 is rotated the dial 40 is correspondingly rotated. The shaft has roller bearings 41 and 42 in the frame 10 so that it may be rotated with minimum friction.

An indicating price beam, or bar 43, is frictionally secured to the frame 10 as at 44. The price beam consists of two similar beams joined together so that there will be one confronting each side of the scale disk.

Referring to Fig. 2, it will be observed, that the arm 45 of the beam 43 is located substantially above a line passing diametrically through the axis of the beam, while the arm 46 on the opposite side of the axis is located in a similar manner below the line passing through the axis. A wire 47, is secured to the end 46, of the arm and passes directly through the center and is secured to the end 45 of the arm on the opposite side of the axis. As a matter of fact this is not necessarily a continuous wire but as shown is a wire secured to each of the arms and the two wires are located in the same longitudinal plane. By means of this wire the reading on the rotating computing disk is easily and quickly made.

The beam 43 is located on the rear of the scale while the beam 50 is located on the front. The two beams are connected together at their respective ends, as at 51 and 52, and the beam on the front side carries a wire 53. These beams are so arranged that they move together and they may be rotated around their axis and frictionally retained in the position in which they have been placed. Each of the arms of the beams contains upon its face a removable price scale, 54, 55, 56 and 57, respectively, any one of which may be removed from its arm and substituted by other scales of a similar character, but provided with different price marks. The indications on these scales give, preferably, the price per pound of the commodity, and for purposes of convenience of operation the odd figures such as 5, 7, 9, 11, etc., may be found on the arm on one side of the beam, while the even figures, such as 6, 8, 10 12, etc., may be found on the arm on the opposite side, so that the user of the scale may readily be able to find the price for which he is looking.

The indications on the computing scale disk extend circumferentially in consecutive order from the indicating wires on one of the arms to substantially the same point at the other arm. For convenience the outside or largest circumference of the scale disk is indicated by numbers marking pounds from 1 to 20, beginning at the left arm 51 near wire 53 extending circumferentially around the lower part of the scale disk to the arm 52 and in like manner extending from the arm 52 circumferentially around the top part of the scale disk to the arm 51.

A similar scale, indicating pounds, is made on the inside of the circle, nearest the axis, but the pound scale on the inside of the circle is indicated consecutively in the opposite direction from that on the outside of the circle. This scale is intended for use in arriving at the net weight of commodities that are contained in vessels by automatically deducting the tare weight from the gross weight.

The price scale, on each side of the rotating dial, may be the same or it may be different, as may be desired. If it is desirable to have a larger range or scope of the device I prefer to make the dials on the respective sides each cover a separate range and have corresponding price-scales on opposite sides of the disk, so that the scale may cover a larger scope of operation.

The eye support 11 upon which the frame 10 is intended for use, is adapted to swivel so that the scale may be readily turned or partly rotated to face the customer after observation has been noted by the purveyor. The frame 10 which carries all of the parts may be loosely turned upon the support 11 that observation on either side of the same may be quickly made and readily seen. This greatly increases the value of the device doing away with the necessity for the user to walk around from one side to the other to make his observations.

A scale pan 60 is secured to the sliding member 13 by means of triangular arms 61, as usual in scales of this character. It is, of course, obvious that a platform may be employed with equal facility and therefore I wish it distinctly understood that my invention is not limited to this method of supporting the articles to be weighed.

The price beam, it will be observed in Fig. 1, as indicated by dotted lines, has been moved to a position in advance of the normal position of said beam. This is done to indicate the tare weight or weight of the vessel 62, which is to be filled with the material to be weighed so that the net weight of the material contained in said vessel may be readily ascertained and read directly from the scale disk. The price indicating arms normally stand at 0 with reference to the computing disks. In order to see and ascertain the net weight of the vessel at each time it is being weighed, the vessel is first weighed alone and its weight indicated. Assume that the vessel weighs 2 pounds, it is then taken from the scale and the price beam is moved to the normal position of 2 pounds, as shown by dotted lines in Fig. 1. The price beam is now left in this position and the vessel 62 may be filled with the material to be weighed and the disk will move the distance required to register 2 pounds before the 0 mark of the outside scale comes opposite the indicating arm of the beam and after the indicating mark passes the wire, of the particular arm, all of the weight indicated thereafter represents the net weight or the weight of the contents of the vessel.

An adjusting screw 63 passes through a threaded projection 64 from the frame 10 and is guided in the projection 65. The upper end of this adjusting screw comes in contact with a shoulder on the price beam and is a means for adjusting the normal position of the price beam with reference to the 0 point on the scale disk.

The arrows, in Figs. 1 and 2, show the direction of movement of the disk at the time when articles are being weighed. Assume that the price of the material to be weighed is five cents (5¢) per pound and the scale disk shows that there are 4 pounds of material on the scale, then the indication 20 on the disk will lie immediately under the price 5 on the price beam, will show at the wire and indicate that the price of the commodity is twenty cents (20¢). If now the price of the commodity is six cents (6¢) per pound the indication will be shown upon the opposite arm or end of the beam, as even numbers are shown on the right hand side and odd numbers on the left hand side, for the purpose of convenience of observation.

Any number of disks, with various compilations on their respective faces may be employed in connection with suitable cards for the price beams which cards may be inserted therein in proper relation to the said disks, so that the scope of the scale may thus be very greatly expanded.

While I have herein described a single embodiment of my invention for the purposes of illustration, it is evident that many changes may be made in the structure without departing from the scope and spirit of the appended claims.

Having described my invention, what I claim is:

1. A computing scale, comprising, in part, a disk-dial provided with a plurality of concentric semi-circular series of indications reading progressively from a radial line, on one side of the axis, to a diametrically opposite radial line and another like series of indications reading progressively from the last mentioned radial line to the first mentioned line on the opposite half of the disk, a price beam for coöperation with said dial, means to support the dial for rotation from a normal position and return thereto, and means to support the beam for adjustment to other positions than normal.

2. A computing scale, comprising, in part, a frame, a disk-dial supported thereby provided with a plurality of concentric semi-circular series of indications reading progressively from a radial line, on one side of the axis, to a diametrically opposite radial line and another like series of indications reading progressively from the last mentioned radial line to the first mentioned line on the opposite half of the disk, and a price-beam extending diametrically across the disk, said disk and beam rotatable each with respect to the other and each with respect to said frame.

3. A computing scale, comprising, in part, a disk-dial provided with a plurality of concentric semi-circular series of indications reading progressively from a radial line, on one side of the axis, to a diametrically opposite radial line and another like series of indications reading progressively from the last mentioned radial line to the first mentioned line on the opposite half of the disk, one of each series of said indications reading progressively in opposite direction to that of the other of its respective series, and a price-beam extending diametrically across the disk, and rotatably adjustable with reference to a fixed point on the disk.

4. A computing scale, comprising, in part, a frame, a rotatable disk-dial having a series of concentric computative indications on each side thereof and a price-beam rotatably adjustable on the frame and crossing the front and rear sides of said disk.

5. A computing scale comprising a long narrow frame, a shaft extending through said frame from back to front near the middle thereof, indicating means upon the front end of said shaft, a pinion upon the rear end of the shaft, a sliding rack member coöperating with said pinion, said frame providing guiding bearings therefor, and said rack member movable vertically within the lateral confines of said frame, a lug extending backwardly from each side of said frame, a drum supported by and between said lugs within the lateral confines of said frame, flexible connections between said drum and sliding member, and a weight carried by said drum within the lateral confines of said frame, said indicating means being visible upon each side of said long narrow frame and the parts carried thereby.

6. A computing scale comprising a frame rotatably supported at its top, said frame being long and narrow, a disk-dial carried by said frame in front thereof, a sliding member carried by said frame in rear thereof, within the lateral confines of the frame, operating connections between said sliding member and the dial, and a price beam carried by the frame between it and the dial, said price beam providing indications for coaction with both sides of said dial, for purposes described.

7. A computing scale, comprising, in part, a frame, a rotatable disk, supported on said frame, a vertically movable member for raising a weight and for rotating the disk, a weight, a flexible member connecting said weight and vertically movable member and a price-beam crossing both sides of said disk secured together at its ends and rotatably adjustable on said frame.

8. A computing scale, comprising, in part, a frame, a rotatable disk supported thereon, a price-beam crossing the face of said disk carrying removable price cards, means for detachably holding said cards on said beam, and means for adjusting said price-beam with respect to said disk.

9. A computing scale comprising, in part, a frame, a rotatable disk having graduated indications thereon, a price-beam, crossing the face of said disk and an adjusting screw carried by the frame for rotatably adjusting said beam with reference to a given point on said disk.

10. In a computing scale, a disk dial, a series of indications near the outer edge of said disk dial reading progressively from one radial line to another in terms of pounds, a plurality of concentric series of indications within said pound indications reading progressively from one of said radial lines to the other, a second series of pound indications reading progressively from one to the other of said radial lines in the opposite direction to the progressive reading of the other series of pound indications, a price beam extending diametrically across the dial and means for rotatively adjusting the beam and dial relative to one another.

In testimony whereof I hereunto set my hand in the presence of two witnesses.

GEORGE W. KONE.

In the presence of—
 WINFIELD KNIGHT,
 B. D. LAMONT.